United States Patent [19]

Levy

[11] Patent Number: 5,215,815
[45] Date of Patent: Jun. 1, 1993

[54] HOSPITAL BED SHEET AND PILLOW-CASE MATERIAL

[75] Inventor: Harry Levy, Hollis Hills, N.Y.

[73] Assignee: Fabrite Laminating Corp., Wood-Ridge, N.J.

[21] Appl. No.: 956,161

[22] Filed: Oct. 5, 1992

[51] Int. Cl.$^5$ .................................................. B32B 7/00
[52] U.S. Cl. .................................... 428/246; 428/248; 428/253; 428/520; 428/921
[58] Field of Search ............... 428/246, 248, 253, 520, 428/921

[56] References Cited

U.S. PATENT DOCUMENTS 4,869,952  9/1989  Levy ..................... 428/253
5,168,007  12/1992  Levy ..................... 428/248

Primary Examiner—William J. Van Balen
Attorney, Agent, or Firm—Charles I. Brodsky

[57] ABSTRACT

The hospital bed sheet and pillow-case material of the invention is a 2-layer fabric, incorporating a first layer of one of a fire retarding poly-cotton woven or polyester knit fabric, and a second layer of a fire retarding polyvinyl chloride film. A water-based fire retarding adhesive is included, joined between the first and second layers, for laminating them together.

7 Claims, 1 Drawing Sheet

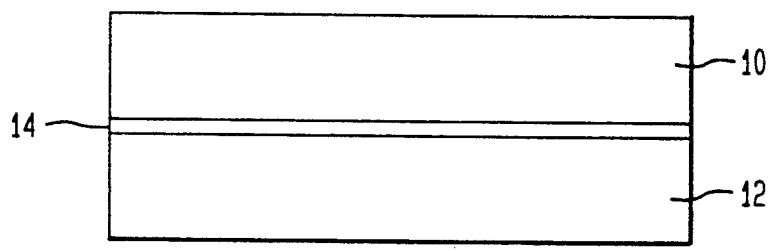

HOSPITAL BED SHEET AND PILLOW-CASE MATERIAL

FIELD OF THE INVENTION

This invention relates to hospital bed sheet and pillow-case material constructions which are both durable and reusable.

BACKGROUND OF THE INVENTION

As is well known and understood, we presently live in an age where environmental issues are becoming more and more important, and the consciousness of them is increasing. One of the areas which has generated almost the greatest amount of attention in recent months has been the health-care industry, where increased attention is being given to thoughts to re-design so as to make as many of the products there employed durable and reusable where appropriate. This has followed from a realization that not only has the cost of health- care sky-rocketed, but that the costs involved in disposing of medical fabrics has doubled in recent times, and appears to be continuing even higher.

It is an object of the invention, therefore, to provide a medical fabric which is particularly useful for a hospital bed sheet and pillow-case material which can be used over-and-over again, and which is both durable and reusable.

It is a further object of the invention to provide such a material which can similarly be used as pillow covers, waterbed liners and even shower curtains for similar such repeated use.

It is yet a further object of the invention to provide such materials, which—while being durable and reusable—additionally afford a high degree of fire resistance and microbial protection.

SUMMARY OF THE INVENTION

As will become clear hereinafter, the hospital bed sheet and pillow-case material of the present invention is a two-layer fabric, incorporating a first layer of one of a fire retarding, antimicrobial poly-cotton woven or polyester knit fabric, and a second layer of a fire retarding, antimicrobial polyvinyl chloride film. As will become clear, this construction also includes a water-based fire retarding adhesive, joined between the first and second layers, for laminating them together. For such uses as in hospital bed sheets, pillow covers, pillow-cases and waterbed liners, the first layer—in a preferred embodiment of the invention—will be seen to be selected of a weight between 2.0 and 2.6 ounces per square yard, to provide an essentially light-weight material. Obviously, the fire retarding and antimicrobial characteristics which define the resultant material will be appreciated to be equally useful in other than "hospital" environments—but are likewise useful in nursing facilities, in old-age homes, and in private, residential use as well.

BRIEF DESCRIPTION OF THE DRAWING

These and other features of the invention will be more clearly understood from a consideration of the sole figure of the drawing showing the 2-layer construction of the hospital bed sheet and pillow-case material embodying its principles.

DETAILED DESCRIPTION OF THE DRAWING

In accordance with the invention, a 2-layer fabric is described which offers the features of fire resistance and microbial protection. Thus, and in the drawing, the hospital bed sheet and pillow-case material includes a first layer 10 which can be of a fire retarding poly-cotton woven or polyester knit fabric, of weight from 2.0 to 2.6 ounces per square yard. More particularly, for a poly-cotton woven fabric of 65% to 70% polyester and 30% to 35% cotton composition, a basic fabric weight of 2.2 to 2.6 ounces per square yard is selected to afford a light-weight characteristic. For a 100% polyester knit fabric, on the other hand, a weight between 2.0 ounces to 2.6 ounces per square yard has been determined to be preferable.

Such fabric, of the selected material, is then scoured, bleached and dyed to a white color. The fabric material selected is then treated with a fire retarding chemical in the nature, for example, of an organic phosphate ester-/ammonium salt—of a type available from the Apex Chemical Company of Elizabeth, N.J, as its Apex Flame Proof Emulsion No. 3105. Alternatively, an inorganic salt, fire retarding material can be used, in formulation 20% strength 80% water—for example, as available from Apex Chemical Company as its Flame Proof Emulsion No. 1945. With either of these fire retarding salt emulsions, the poly-cotton woven or polyester knit fabric is dipped—in one aspect of the invention—into these emulsions for a few seconds, and then cured for approximately 90 seconds at 320° F. Testing has shown that these fire retarding fabrics will then satisfy such standards as No. 701 of the National Fire Protection Association, No. 84 of the Canvas Products Association International, and No. 302 of the Motor Vehicle Safety Standards. As will be appreciated by those skilled in the art, these are the usual types of flame resistance standards applicable to the types of fabrics and materials in question.

Once so treated, the hospital bed sheet and pillow-case material of the invention is further treated—by similar dipping and curing—in an antimicrobial preservative with or without an additional antifungal agent. Such a solution is available from the Angus Chemical Company of Northbrook, Ill., under its Tradename BIOBAN CS No. 1135, primarily composed of an aqueous solution of 4,4 Dimethyl 1,3 Oxazolidine and DI-Iodomethyl-P-Polysulfone.

Thus, the first layer 10 of the material of the invention will be seen to be of a fire retarding and antimicrobial characteristic.

The second layer of the invention, shown by the reference numeral 12, is a polyvinyl chloride film of white coloration. As is well known and understood, such film has a degree of chlorine in its polymer molecule, and as a result offers an inherent degree of resistance to ignition. In accordance with the invention, such layer is also dipped and treated into an antimony solution—to increase its fire retardation—and is thereafter cured before further comparable treatment with an antimicrobial solution, of a type available from Morton Chemical Company under the Tradename VINYZENE, which essentially is a solution of 10,10 Oxybisphenoxarsine (OBPA). Testing has shown with this arrangement, that even a low concentration of such antimicrobial material is effective in providing a long term protection against a broad spectrum of bacterial and fungal attacks—as well as helping to prevent the build up of musty odors, permanent staining, surface growth and reducing brittleness and/or premature product failure. Such a polyvinyl chloride film, fabricated in this manner, has been tested and found to be particularly attractive for further lamination, and where high levels of fire retardation and bacteria resistance is required.

In further accordance with the invention, the two layers 10 and 12 are then laminated together with a water-based fire retarding adhesive. Experimentation has shown that any one of an ethylene vinyl chloride, ethylene vinyl acetate, ethylene emulsion or ethylene acrylic polymer solution is effective in this and particular success has followed through the use of such an adhesive sold under the Tradename FYARESTOR-100, as available from the Witco Chemical Company of Houston, Tex. as an organic flame retarding halogen. Such an adhesive, 14, can be applied to laminate the polyvinyl chloride film to the fabric 10 through the standard use of an engraving roll, or of a reverse roll, or by coating, or by any other appropriate manner of lamination. Once the lamination has been effected, the resultant material is then cured, according to the invention, at between 240° and 260° F.

One very important advantage of the invention, is that the resulting fabric can be easily damped down and wiped off. This is of particular significance for use in hospital and nursing home environments, where sheets and pillow cases made of the fabric frequently tend to get soiled through daily use. Testing has shown that the fabric materials can simply be damped-dried and cleaned off, quickly and without undue effort, and then continued to be used as needed. Such durability of the fabric will thus also be understood as making the fabric material highly desirable for its intended purposes.

While there have been described what are considered to be preferred embodiments of the present invention, it will be readily appreciated by those skilled in the art that modifications can be made without departing from the scope of the teachings herein. Thus, incorporating the antimicrobial and antifungal characteristics available with the types of "dipping" solutions described, it will be seen that the advantages of the invention can also be had if only a fire retarding characteristic were desired. In those situations, the required flammability specifications and standards of the appropriate industry associations will continue to be satisfied. For at least such reason, therefore, resort should be had to the claims appended hereto for a true understanding of the scope of the invention—realizing that although the invention is couched in terms of a hospital bed sheet and pillow-case material, its principles apply equally as well to pillow covers, water-bed liners, shower curtains or other desired applications.

I claim:

1. A hospital bed sheet and pillow-case material comprising:
   a first layer of one of a fire retarding poly-cotton woven or polyester knit fabric;
   a second layer of a fire retarding polyvinyl chloride film;
   and a water-based fire retarding adhesive joined between said first and second layers for laminating said layers together.

2. The hospital bed sheet and pillow-case material of claim 1 wherein said first layer is also of an antimicrobial characteristic.

3. The hospital bed sheet and pillow-case material of claim 1 wherein said second layer is also of an antimicrobial characteristic.

4. The hospital bed sheet and pillow-case material of claim 1 wherein said first and said second layers are also of an antimicrobial characteristic.

5. The hospital bed sheet and pillow-case material of claim 1 wherein said fire retarding adhesive is composed of one of an ethylene vinyl chloride, ethylene vinyl acetate, ethylene emulsion or ethylene acrylic polymer solution.

6. The hospital bed sheet and pillow-case material of claim 1 wherein said first layer comprises a poly-cotton woven fabric of 65% to 70% polyester and 30% to 35% cotton composition, and of a weight between 2.2 to 2.6 ounces per square yard.

7. The hospital bed sheet and pillow-case material of claim 1 wherein said first layer comprises a 100% polyester knit of a weight between 2.0 to 2.6 ounces per square yard.

* * * * *